United States Patent
Baum-Waidner (10) Patent No.: US 6,385,725 B1
(45) Date of Patent: May 7, 2002

(54) SYSTEM AND METHOD FOR PROVIDING COMMITMENT SECURITY AMONG USERS IN A COMPUTER NETWORK

(75) Inventor: Birgit Baum-Waidner, Rueschlikon (CH)

(73) Assignee: Entrust Technologies Limited, Ottawa (CA)

( * ) Notice: Subject to any disclaimer, the term of this patent is extended or adjusted under 35 U.S.C. 154(b) by 0 days.

(21) Appl. No.: 09/891,753

(22) Filed: Jun. 26, 2001

Related U.S. Application Data (63) Continuation of application No. 09/138,734, filed on Aug. 24, 1998, now abandoned.
(51) Int. Cl.[7] .................................................. G06F 1/24
(52) U.S. Cl. ....................................... 713/175; 713/182
(58) Field of Search ..................................... 713/175, 182

(56) References Cited

PUBLICATIONS

Blaze, Matt; Feigenbaum, Joan and Lacy, Jack: "Decentralized Trust Management," AT&T Research, Murray Hill, NJ 07974 (1999 IEEE).

Eastlake, D. etl.: CyberCash Credit Card Protocol Version 0.8; Network Working Group, Request for Comments: 1898, Internet RFC/STD/FY/BCP Archives, Jul. 8, 1995.

*Primary Examiner*—Thomas R. Peeso
(74) *Attorney, Agent, or Firm*—Vedder, Price, Kaufman & Kammholz (57) ABSTRACT

A system and method for use in a networked communication system provides a type of liability or commitment security mechanism which enables, for example, a merchant to rely on digitally signed statements, and at the same time enables a buyer to selectively enter a commitment limit before a digital signature is made by his or her private signing key. A trusted certificate authority enforces that the chosen limit cannot be exceeded prior to the transaction being fulfilled by issuing a commitment certificate on a per transaction basis which gives the other party a guarantee, even in case the key was compromised. The disclosed system and method allows a user to limit total liability when using a digital signing key even if used to sign any number of commitments or statements with other parties. It allows the beneficiary to trust in the received commitment confirmed by the commitment certificate.

36 Claims, 5 Drawing Sheets

SYSTEM AND METHOD FOR PROVIDING COMMITMENT SECURITY AMONG USERS IN A COMPUTER NETWORK

This application is a continuation of application Ser. No. 09/138,734, filed Aug. 24, 1998, entitled "System and Method for Providing Commitment Security Among Users in a Computer Network now abandoned."

FIELD OF THE INVENTION

The invention relates generally to systems and methods employing digital signature techniques, and more particularly to systems and methods for facilitating electronic commerce or other transactions.

BACKGROUND OF THE INVENTION

Digital signatures are currently not established to be used as equivalents to "handwritten" signatures for mainly two reasons: (a) a uniform legal framework has not been established which accepts digital signatures in the same manner as handwritten signatures, and (in spite of sufficiently secure existing signing algorithms) (b) the technical possibility of obtaining signatures in an underhanded way aided by such mechanisms as Trojan horses, cannot be ignored. Even when using secure hardware, the possibility for extortion by forcing a person to make a digital signature might be higher than in the non-electronic environment due, for example, to a reduced potential of witnesses.

Also, in electronic commerce, it is possible for a buyer to deny having made a digital signature after receiving goods from a merchant in some cases. This is generally not acceptable. A merchant that obtains a digitally signed order from a buyer should not later have the buyer be able to repudiate its signature without suitable liability. Similarly, it is not acceptable for parties to a contract, if properly signed using a contract signing protocol, to repudiate signatures because a signor claims that his original signature was somehow compromised at the time of signing.

As known in the art, many signing protocols exist. For example, a public/private key signing technique may be used wherein a public verifying key is used to verify a signor's signature, which indirectly confirms his possession of a certain private (e.g., secret) signing key.

Some attempts have been made to overcome the above-mentioned problems. For example, some systems attempt to limit liability of a purchaser or limit a contract by requiring payment authorization at the time the specific transaction is taking place, although this is not typically sufficient to provide an acceptable limit for the payer in case his key is compromised. For example, Secure Electronic Transaction (SET) protocol is typically used in credit card payment systems. In these instances, a buyer typically authorizes payment in the context of a specific transaction by using a digital signature. Prior to performing a purchase order, a merchant typically requests authorization from the guaranteeing institution. Typically the seller has the sole discretion of the amount requested as guaranteed by the financial institution.

For example, the seller typically enters via a keypad, the dollar amount of the transaction or a higher amount such as in the case of hotel stays and the like. The buyer typically has no way of limiting the authorization request. A financial institution upon receiving an authorization request typically sends back a guarantee of payment reply. A payment gateway generates and digitally signs an authorization response message which includes a copy of a payment gateway signature certificate. The response or reply is intended to give a guarantee to the seller that the seller will be paid as expected. However, the buyer has no control of the amount claimed in the authorization request. When the authorization amount exceeds an amount desired by the buyer, the buyer can be liable for excessive amounts in the event of a compromised signing key.

Another mechanism of payment and payment authorization includes electronic checks. With such systems, a written agreement between the holder of the account and the bank can limit liability in case of forgery or other problem. However, the electronic checks are typically issued by the bank before the bank knows the context of a given transaction. Generally, no commitment made by the holder of the account is confirmed by the bank in this context. Typically, there is only the commitment of the bank to fulfil at most the guaranteed payment to the seller. As such, the system cannot limit the account holder's liability for the compromised case to a lower level than corresponds to the bank guarantees for all issued checks (the same holds for pre-paid bank checks) which might be much too high to be acceptable for the holder for the account in case it is not possible to prove that his key was compromised (which might be very difficult or even impossible in the case of a Trojan Horse program which might destroy itself after the attack).

Moreover, none of the approaches so far enables the user to limit his commitments for, e.g., the case of a compromised key, and at the same time enables the user to present a commitment (e.g., prior of and independently from performing a payment) the merchant can trust, since the merchant knows that the user is bound to this commitment even in case the signing key is claimed to having been compromised. Also, known systems generally do not allow a user to a priori define on his own the (e.g., monthly) totals of such commitments, as well as on a per transaction basis by selecting, for example, after negotiation with the merchant, a specific commitment which is prevented to exceed the total.

Consequently, a need exists for a networked communication system and method for providing commitment security among users that facilitates user selected commitment limits on a per track transaction basis and which utilizes a trusted authority unit to confirm that each level of commitment, such as a dollar limit in a financial transaction, can be met before the commitment is due. It would be desirable if such a system and method facilitated use of per transaction user selected commitment condition data to narrowly restrict the validity of a commitment.

It would also be desirable to provide a system and method that included commitment certificate issue condition data which facilitated a commitment certificate authority's check so that the user's specified conditions are met prior to issuance a commitment certificate.

It would also be desirable if such a system included per transaction user selected commitment conditions to restrict the validity of the commitment. It would also be desirable if such a system could issue commitment certificates issued by a trusted authority so that all members of the transaction can trust in the commitment. It would be desirable if such a system, also allowed a written agreement between user and commitment certificate issuer to regulate the user's binding to his digital signature and to issued commitment certificates, even in case that the user later claims that its key was compromised. This would allow, for example, all members of a transaction to be confident that if a repudiation occurs, liability (an example for a type of commitment) is at least that which was confirmed by the authority and cannot exceed a user specified limit.

DETAILED DESCRIPTION OF THE PREFERRED EMBODIMENTS

Briefly, a system and method for use in a networked communication system provides a type of liability or commitment security mechanism which enables, for example, a merchant to rely on digitally signed statements, and at the same time enables a buyer to selectively enter a conditional commitment, such as a limited liability, on a per transaction basis, before a digital signature is made by his or her private signing key. A trusted certificate authority, enforces that the chosen limit cannot exceed a predefined limit prior to the transaction being fulfilled by issuing a commitment certificate on a per transaction basis. The commitment certificate can reduce or remove a transaction partner's need to check the signer's key certificate at a certificate revocation list, even where the key was compromised, or, even if immediately after issuing the commitment certificate, the signer's public key was revoked. The disclosed system and method allows a user to limit total liability when using a digital signing key even if used to sign any number of commitments or statements with other parties. This can be of great value in the instance where a secret signing key of the user is potentially compromised. As such, coverage p to a user acceptable limit is guaranteed by the commitment certificate trusted authority.

In one embodiment, a first communication unit, such as a computer program or computer associated with a party to a contract or a buyer in a financial transaction, includes a commitment certificate request provider that utilizes user selected per transaction based commitment data, that represents, for example, liability limit data such as a per transaction dollar limit that may be less than a maximum allowable limit up to which the user confirms to take the other's damage. The commitment certificate request is generated based on commitment data and unique context data such as data representing necessary information to a sale or contract provision wherein the information is associated with the first communication unit and another communication unit, such as a seller or other party to the commitment or transaction. The unique context data may include for example data such as a serial number or other information representing a particular computer, computer program or other user so that, if desired, the commitment certificate request is generated with information identifying the buyer, seller and trusted authority that generates the commitment certificate.

In one example, the trusted certificate authority serves as a commitment manager for one or more users, such as software programs, which continuously updates per client commitment allowance data so that for each transaction for a given client or user, a record of liability (or commitments) is maintained to ensure that a maximum liability (or commitment level) as defined by a user is not exceeded. A common limit for all commitments can be generated and stored a priori and is user selectable. For instance, a security officer may input through a keyboard, user specific specified maximum commitment data (e.g., the overall liability limit, a monthly limit, a transaction limit), explicit rules by which to determine whether a commitment should be certified, specific passwords which must be provided or other conditions which have to be fulfilled to allow issuance of the commitment certificate during a transaction, or other data that can be witnessed or confirmed by the commitment certificate authority by issuing commitment certificates, such as a priori known conditions for the validity and enforceability of the commitment.

Generally, a user, such as a computer, other communication device or computer program, generates a commitment certificate request to the trusted commitment certificate authority. The trusted commitment certificate authority then verifies the signature on the request to determine that it came from an appropriate user. In addition, the trusted commitment certificate authority evaluates the per commitment allowance data, such as the user selectable total commitment limit data together with additional issuing condition data contained in the user's commitment certificate request, to determine whether the request includes authorization for a commitment that exceeds the maximum allowable commitments or limits preset by the client. If acceptable, a commitment certificate is issued by the trusted commitment certificate authority. This commitment certificate is then sent (for example, by the certificate requester) to the other member or members of the transaction where it may then be verified by evaluating the digital signature of the commitment certificate authority.

Figure 1:
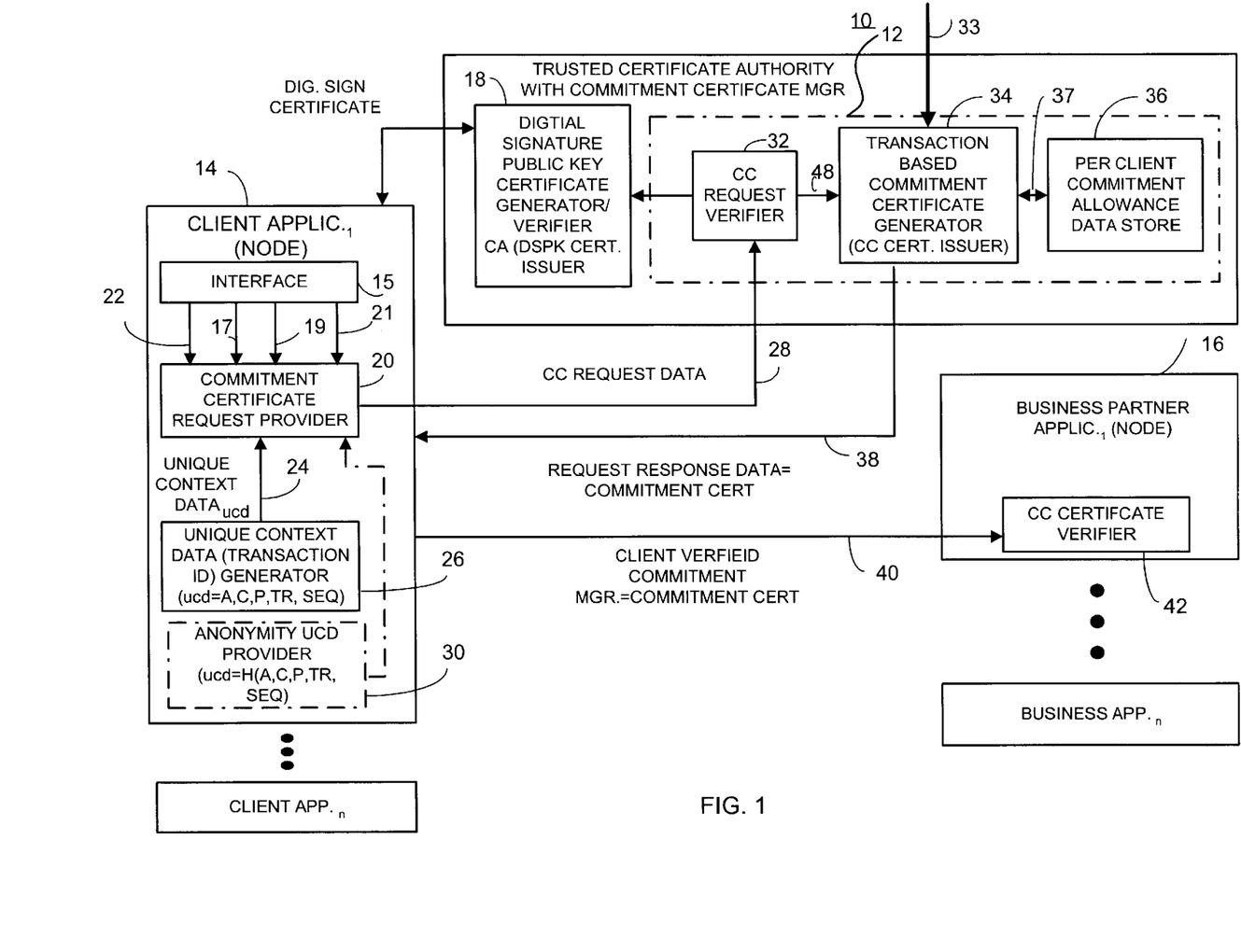
FIG. 1 is a block diagram illustrating an example of one embodiment of a network communication system in accordance with the invention.

FIG. 1 depicts an example of a networked communication system 10 that employs a trusted commitment certificate authority which includes a commitment certificate manager 12. The commitment certificate manager 12 may be a software program stored on a storage medium and loaded, for example, in a server. As used herein a communication unit such as the commitment certificate manager 12 may be a software program, hardware unit or other entity that facilitates communication with another software program, hardware unit or other entity. The networked communication system 10 also includes a client communication unit 14 and other communication unit 16. As shown, many other communication units may also be employed. The commitment certificate manager 12, client communication unit 14 and other communication unit 16 are operatively coupled through any suitable communication links such as a radio frequency link, hardwire networked link or other suitable link.

In this embodiment the networked communication system 10 utilizes a public key infrastructure, as known in the art, so that each of the communication units 14 and 16 have associated digital signature public key certificates signed by a trusted certificate authority, indicated at 18. It does not matter if communication unit 16 has been registered with certificate authority 18 or any other certificate authority, but for unit 14 it is assumed to be registered with certificate authority 18. It will be recognized that the certificate authority 18 and the commitment certificate manager 12 may be distributed in different servers or units or may be in the same unit as shown. It is also assumed that the user's digital signature has no legal meaning (e.g., it is not intended to be used under any digital signature law) except that the a person associated with the user committed and signed handwrittenly or other manner with the commitment authority manager 12, while his signing key was registered (and maybe certified) there, e.g., the following (or the like):

1. I will stick to all obligations, without any liability limit, resulting from my digital signature made with my secret key belonging to the public key registered here, if I do not claim that this key was compromised.
2. In case I claim that the key was compromised, I will (only) be liable for all obligations resulting from commitment certificates.

The client communication unit 14 includes a commitment certificate request provider 20 that generates and sends commitment certificate request data 28. The user selected commitment data 22 may be entered for example through a graphic user interface 15 and represents for example per transaction commitment information that a user wishes to employ on a transaction. As used herein, a "commitment" may be a financial commitment or other nonfinancial commitment. In addition, a transaction may include a plurality of transactions that may be related to a common commitment.

In addition to the user selected commitment data 22, per context user selected certificate issuing condition data 17 may also be provided through the interface 15. Per context user selected certificate issuing condition data 17 represents a portion of data that the commitment certificate manager 12 analyzes to determine whether a commitment certificate should be issued. The condition represented by the issuing condition data 17 must be met prior to issuance of a commitment certificate. For example, the communication unit 14 may dictate commitment certificate issuance criteria, such as bits representing a time condition that must lapse before a commitment certificate can be issued. Alternatively, the per context user selected certificate issuing condition data 17 may be multiple fields wherein one field includes the public signing key of a user and the other field may be a text field such that the identified user must fulfill the condition set forth by signing the text field, the result of which might for example be received as commitment specific issuing condition data 33, before a commitment certificate can be issued.

Other data, such as commitment specific issuing condition fulfilling data 19, may also be provided. The commitment specific issuing condition fulfilling data 19 may include one or more fields wherein the data represents data that must be matched by the commitment certificate authority 12 before a commitment certificate may be issued. This data may be for example a password, a copy of which is prestored in the data store 36 of the commitment certificate authority 12.

Commitment data 22 includes for example three fields where one field is a text field (clear text or encrypted), one field identifies a partner communication unit 16 and another is a value field The text field may include text representing a commitment for a given transaction, such as the text "I am liable for any damage of my business partner "{ }"(unit 16) up to "[ ]", but only in case that I withdraw the order with the reason that my key was compromised, or in case that I do not commit my obligations resulting from this transaction for any other reason." The value field "[ ]" contains the dollar amount for which the user selects that he will be committed during this transaction. The field "{ }" contains data representing the business partner unit 16, a public key of a business partner or beneficiary data. It will be recognized that the information in these fields can be coded if desired and that fewer or additional fields may also be used if desired. "If all commitments used in the system are the same and include a priori the same condition "but only in case that I withdraw the order with the reason that my key was compromised, or in case that I do not commit my obligations resulting from this transaction for any other reason", or only the first part of it, then the system may be thought of as a 'Liability Cover Service', meaning that communication unit 16 or its user knows that the claim signer wold at least take some liability, even in case his key was compromised.

Commitment condition data 21 may also be required for some transactions. This data represent conditions (e.g., in the form of text) that users may wish to have transferred to all parties wherein the condition(s) must be met before the commitment is fulfilled. For example, a buyer may wish to note that his key was compromised, or to bind the commitment to the result of a specified event, or that some activity should take place as a condition precedent to the commitment being fulfilled, e.g., some information to be signed. The commitment conditions 21 do not have to be interpreted or checked by the commitment certificate manager; they only need to be transferred.

The commitment certificate request data provider 20 receives the selected commitment data 22 and any other data (e.g., data 17,19 or 21) along with unique context data 24 generated from a unique context data generator 26. The commitment certificate request data provider 20 utilizes the user selected commitment data 22, the unique context data 24 and the selected commitment condition data 21 (if used) as well as data 17 (if any) and 19 (if any) to generate the commitment certificate request data 28.

The unique context data generator 26 generates the unique context data 24 that is associated with a commitment between the first communication unit 14 and the other communication unit 16 or users associated with these units. The unique context data 24 might be in the form of a bitstream of commitment identifiers or transaction identifiers that are unique among all transactions or commitments supported by one commitment certificate manager 12. For example, the unique context data 24 may be represented as ucd=(A, C, n, P . . . Pn, seq, tr) where A represents data uniquely identifying the commitment certificate manager 12, C uniquely represents a client communication unit 14, n represents the number of different P's, P . . . $P_n$, uniquely represents a number of specified communication units 16, "seq" is chosen by the client communication unit 14 such that no two transactions contexts associated with the communication unit get the same number, and "tr" specifies the transaction which may be for example a specific unique offer in the case of a contract which may for example include a date, a dollar amount for goods that are purchased or suitable data representing a transaction between the communication unit 14 and the communication unit 16. It will be recognized, however, that the transaction data "tr" may not be needed to be transferred in clear text and can be replaced by a cryptographically strong hash function of "tr". It might even not be needed at all. Moreover, for efficiency purposes a cryptographically strong hash function of the unique context data(ucd) may also be used as context data. Therefore, the dashed box 30 entitled anonymity unique context data provider is a cryptographic module that performs a hash function on any unique context data 24 which then may be used as the unique context data by the commitment certificate request data provider 20.

The commitment certificate manager 12 includes a commitment certificate request verifier 32, a transaction based commitment certificate generator 34 and a per client commitment allowance data store 36 that contains per client communication unit commitment allowance data 37. The commitment certificate request verifier 32 receives the commitment certificate request data 28 from the first communication unit 14 and determines whether a commitment certificate has already been issued for a given context based on, for example, the unique context data. The commitment certificate request data 28 includes, among other data, the selected commitment data 22 and the unique context data 24. As such, the commitment certificate request verifier 32 evaluates the unique context data 24 to determine whether the same context has already been issued a commitment certificate. It does this by evaluating a list of 'ucd's for which certificates have been issued that are stored in the suitable database by the transaction based commitment certificate generator 34. If a commitment certificate has already been generated for the given context 'ucd', the commitment certificate manager 12 prevents another commitment certificate from being generated for this ucd. In this embodiment, multiple commitment certificates may be generated for the same transaction provided the 'ucd's are different (e.g., due to different 'sec's). For example, if multiple payments are to be made before a final transaction is completed, multiple commitment certificates may be generated for each partial sum authorized based on the selected commitment data with different ucd's.

The transaction based commitment certificate generator 34 includes a digital signature authenticator, such as a public key based certificate verifier, that utilizes conventional public key infrastructure cryptographic certificate verification schemes. The commitment certificate manager 12 serves as a trusted third party commitment limit authority, which may be referred to as a 'Liability Authority' if the commitment always contains the commitment to be liable up to a certain amount,. Such a 'Liability Authority' allows the total liability to be limited statically or on a per time interval basis by a user through limiting the total liability a priori and through selected liability data such as the commitment data 22 on a per transaction basis. The commitment allowance data store 36 contains, among other things, per user commitment allowance data 37. For example, per user allowance data 37 may be data that represents the total liability or limit that each user is willing to commit for his signatures for the case that his signing key is compromised. The certificate commitment manager 12 evaluates the per client commitment allowance data 37 through the transaction based commitment certificate generator 34 to determine whether a commitment certificate should be generated in the form of request response data 38. The request response data 38 includes a digitally signed commitment certificate that is signed by the transaction based commitment certificate generator 34 which is trusted by all relying parties to the transaction or commitment.

The per client commitment allowance data store 36 may also contain data representing incremental or decremental changes to a user's commitment level so that it can be determined whether or not a limit is reached. Therefore, the per client commitment allowance data store 36 may be updated periodically in response to commitment certificate request data 28 where for example, incremental sums are required over a number of transactions. As such, the commitment certificate generator 34 updates per user commitment allowance data based on the selected commitment data 22 received in the commitment certificate request data 28, and, at least in one embodiment, independently from commitment condition data 21.

Also, the unique context data 24 may include for example data representing a user associated with the first communication unit, a second user associated with the communication unit 16, identification data corresponding to the commitment certificate manager 12, data uniquely representing terms of the transaction, such as, the date or time of the transaction, or any other suitable data.

When per context user selected certificate issuing condition data 17 is used as part of the request data 28, or when the commitment allowance data stored in allowance data store 36 require fulfilling commitment specific condition data from the outside, commitment specific issuing condition data 33 is analyzed to determined whether the received data 33 meets the issuing condition criteria defined in the data 17 and 37. As previously noted, this may be a digital signature from a third party or other commitment certificate authority. Also, where the commitment certificate request data 28 includes commitment specific issuing condition fulfilling data 19, corresponding commitment specific issuing condition data stored in the per client commitment data store (36) or other suitable location, is compared to see if the data in the request together with data 33, if any, matches stored fulfillment data, and similarly, the data 19 are analyzed if they, together with data 33, fulfil the condition data in 17.

If these checks are successful, the transaction based commitment certificate generator 34 generates a public key based commitment certificate that contains, for example, data representing unique context data 24, commitment data 22, commitment condition data 21, commitment data 22, and a public key corresponding to the commitment certificatemanager 12. The signed commitment certificate 38 is then verified by the client communication unit 14 using traditional public key certificate verification algorithms.

The user selected commitment condition data 21 may include for example text data representing the following: a) if I claim that my key was compromised for this transaction; or b) if the stock price of company A drops under $16 and the user associated to P wants then to sell me 100 shares of P's company A shares at $16 each. The user selected commitment data 22 may be data such as data representing "I will buy [value data e.g., 100 shares] of P's company A shares at [second value data e.g., $16 each], wherein identifiers and members referring to commitments managed by the commitment certificate manager are expressed by separate fields.

The receiving communication unit 16 includes a commitment certificate verifier 42 which verifies the client verified and commitment certificate manager signed commitment certificate.

Figure 2:
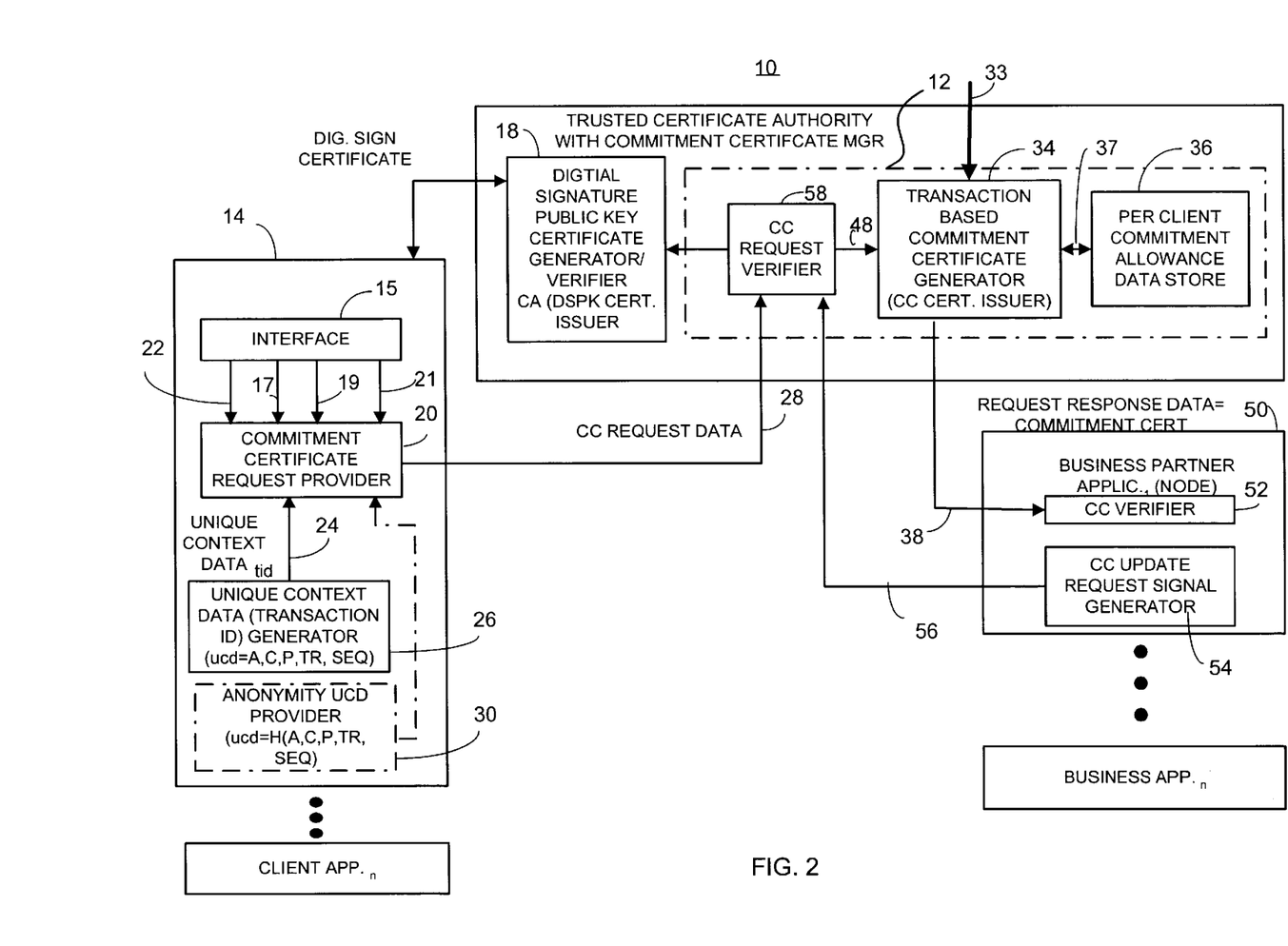
FIG. 2 is a block diagram of another embodiment of a networked communication system in accordance with the invention.

FIG. 2 shows a system similar to that shown in FIG. 1 except that the unit generating the commitment certificate request data 28 does not receive the response data 38. Instead, the other unit to the transaction receives the commitment certificate 38 directly or indirectly from the commitment manager 12. In this embodiment, the communication unit 50 that receives the commitment certificate 38 includes a commitment certificate verifier 52. The commitment certificate verifier verifies that the public key commitment certificate from the commitment manager is acceptable.

In addition, the communication unit 50 also includes a commitment certificate update request signal generator 54 which serves as a type of commitment certificate recharge. The commitment certificate update request signal generator 54 generates a commitment certificate update request signal 56 that the commitment certificate request verifier 58 uses to determine whether an additional commitment certificate should be issued. This may be used for example to update a certificate into one with a smaller commitment, and this is typically only done for a difference of commitment which has not been fulfilled yet and needs never to be fulfilled, from the perspective of the party associated to 50. The certificate update request signal 56 contains at least the 'ucd' and an update request for the commitment the value of which is managed by the commitment certificate manager. The meaning of such a request signal 56 is, for instance, "Reduce value x by value d", e.g., including the commitment from P that P would never charge C for value d within this context. More than one value can be requested to be updated in one update request signal 56, depending on the commitments contained in the commitment certificate which refers to the 'ucd'. After receiving certificate update request data 56, the commitment certificate request verifier 58 checks the 'ucd', checks the last recently issued certificate for 'ucd' and, e.g., if the difference values d are smaller or equal to the corresponding commitment values, the commitment certificate request verifier 58 issues the requested updated certificate to the same 'ucd' and updates the stored commitment allowance data 37 in 36, e.g., adds 'd' onto the counters for the corresponding commitments or limits, respectively. For instance, a hotel might have required a commitment certificate over $500 although the room booked for one night is only $90. After the customer paid $90, the hotel sends a commitment certificate update request signal to 12 where d=$410 are requested to be recharged. The customer's commitment limit which was $1000 before the transaction and $500 after the transaction is increased now by $410 to $910. Thus, the customer is able to issue more commitments, i.e., request and get commitment certificates, than without the recharging. In this example, only amounts not used are recharged which avoids recharging repetition attacks which could cause damage beyond the a priori specified limits.

Figure 3A:
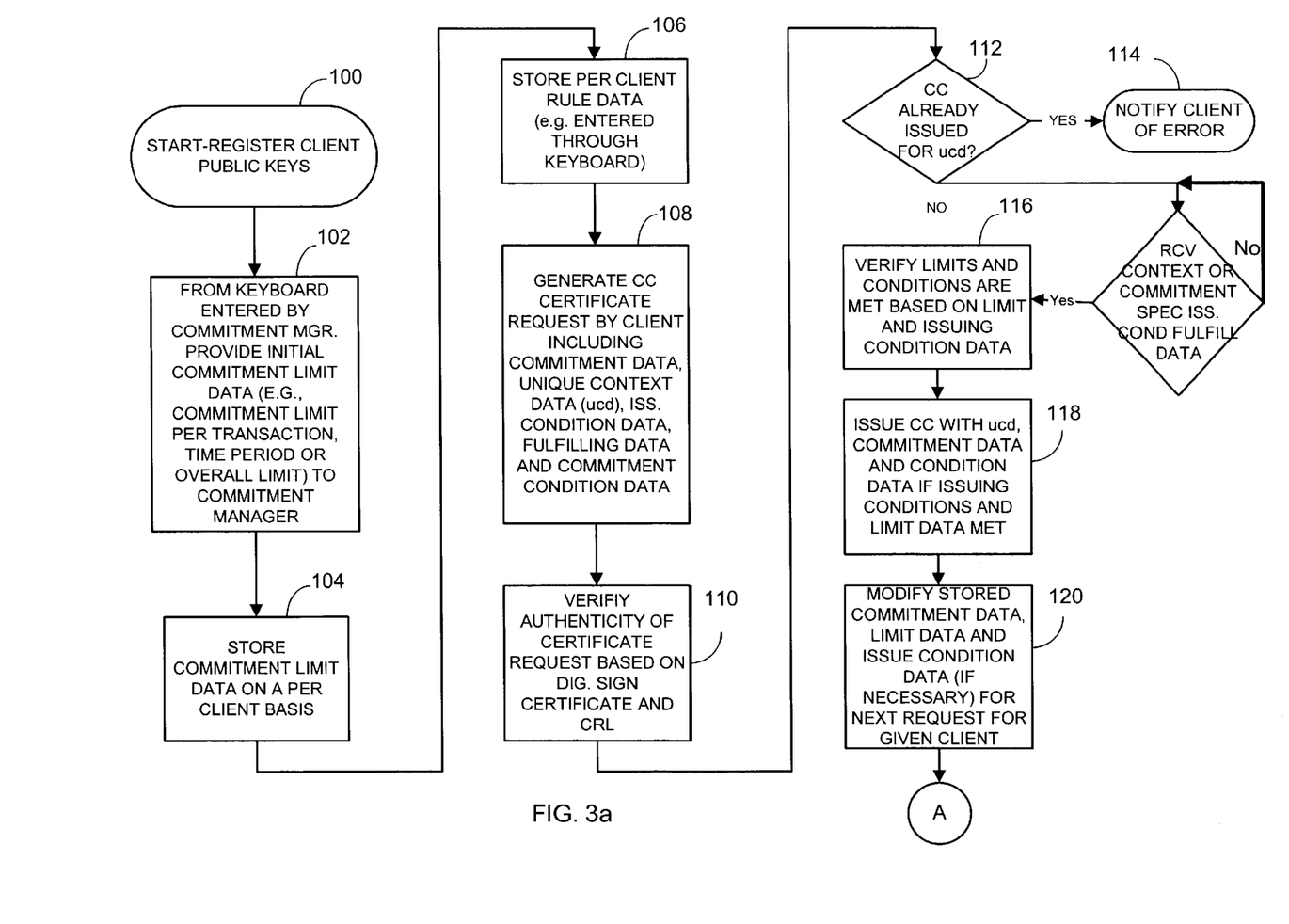
FIGS. 3a and 3b are flow charts depicting a method of operation of the network communication system shown in FIG. 1.

Referring to FIG. 3a, a method for providing commitment security among users in a computer network is shown. As indicated in block 100, each client communication unit obtains a digital signature public key certificate from a digital signature public key certificate generator or certification authority (e.g., FIG. 1, 18), as known in the art to become a member of the trusted community. The client communication unit obtains a copy of the signed certificate from the certification authority. The trusted certificate authority with the commitment certificate manager 12 stores a copy of the certificate in a common repository, such as a directory as described in ITU-T Recommendation X.501 (1993)|ISO/IEC 9594–2:1995, *Information Technology—Open Systems Interconnection—The Directory: The Models*, to handle key revocation. As shown in block 102, the per client commitment allowance data, e.g., overall maximum limit data on the per transaction and/or client basis, is stored a priori in the per client commitment allowance data store 36. All of this data may be entered, for example, through a keyboard or a graphic user interface by a person. As shown in block 104, once the data is entered, it is stored as commitment limit data for example, key specified commit text and associated limit values on a per client basis.

Since many different types of transactions or commitments may be used among a plurality of users, the commitment certificate manager 12 stores programs and/or algorithms that are used to determine whether a commitment certificate should be issued and/or whether per client commitment allowance data should be modified or updated from transaction to transaction. These rules are programmed and stored as part of the commitment certificate manager, as shown in block 106. This can also include, for example, additional per client or per commitment passwords which will later have to be put in through the client communication unit C into the commitment certificate request as a necessary condition to make the commitment certificate allowable to be issued. The rules may be selected from a list through a GUI at the certificate manager 12. After this initialization data has been entered and stored, transactions and commitments among users may then be analyzed to determine the level of commitment, e.g, a commitment for a limited liability, for which a commitment certificate may be issued on a per transaction or commitment basis.

As shown in block 108, the client communication unit 14 generates a commitment certificate request for analysis by the commitment certificate requests verifier 32. The commitment certificate request verifier verifies the authenticity of the commitment certificate request based on a digital signature included with the commitment certificate request data as signed by the client communication unit and based on, for example, a certificate revocation list as known in the art. In a preferred embodiment, the trusted certificate authority 18 is at the same computer or internal computer network as the commitment certificate manager 12, and the keys used for this systems have to be certified to be used in this system. Thus, it is sufficient to check the local certificate revocation list (CRL) for the commitment service. This is shown in block 110. As shown in block 112, the commitment certificate request verifier determines from a list of stored ucd's that have already been analyzed to determine, whether a commitment certificate has already been issued for the unique context data (If the same ucd is requested again, because client communication unit C maybe did not get the answer, the commitment certificate manager 12 sends the same certificate again, without any new timestamp or other information, but with an error message additionally, see also below.) If a commitment certificate has already been issued, the client communication unit is notified that an error has occurred since each commitment certificate is unique for a given request, as shown in block 114, the issued certificate is just sent again, without any new timestamp or other information, but together with an error message. If no commitment certificate has been issued, the commitment certificate manager determines if it has stored (106) general, or received (17) per context, user selected certificate issuing condition data or commitment specific issuing condition data fulfilling data in the request (28) or received data 33. If so, the system determines whether it has received the necessary commitment specific issuing condition fulfillment data 19 and 33 that match the prestored issuing condition data and in the received issuing condition data 17, and if the commitment in the request would not exceed any predefined limit stored in 36. This is shown in block 116.

If this check is successful, then the commitment certificate manager issues the commitment certificate, as shown in block 118, wherein the complete information contained in the certificate is signed by the commitment certificate manager 12. Then the commitment data and the limit data and the issuing conditions, if necessary, are modified in 36, as shown in block 120.

For example, if the selected commitment data is for $100 and the per client commitment allowance data is set as $200, the commitment certificate request verifier determines that $100 will remain so that a commitment certificate can be generated and generates commitment certificate authorization data 48. If the selected commitment data is within the bounds of the allowance data, the commitment certificate manager issues the commitment certificate which includes the unique context data, selected commitment data and condition data as shown in block 118. This information is signed by the commitment certificate manager 12, and an error message can be returned if the commitment certificate is not allowable to be issued. After the commitment certificate is issued, the transaction based commitment certificate generator modifies stored commitment allowance data accordingly, if necessary. This is shown in block 120. For example, if the transaction had selected commitment data of $100 and the commitment allowance data was set for $200, the updated commitment allowance data may be reduced to $100 for the next transaction.

Figure 3B:
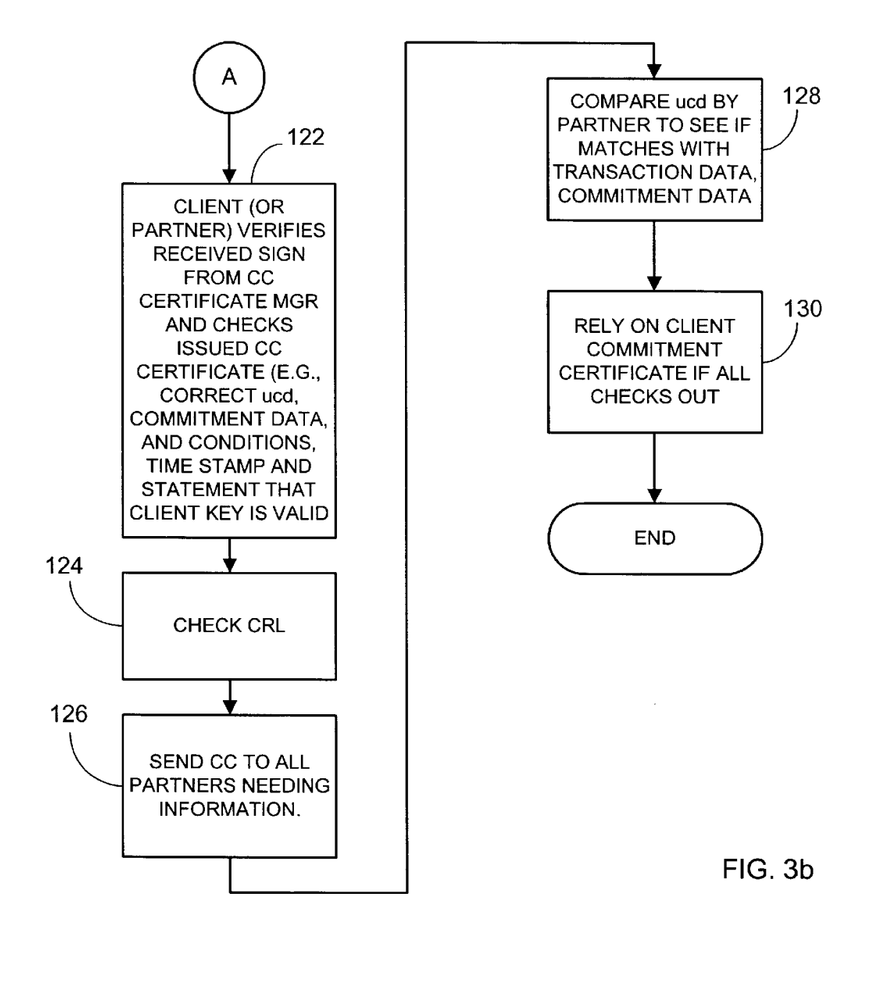

Referring to FIG. 3b, block 122 indicates that the client communication unit that receives the commitment certificate (directly or indirectly) from the certificate manager checks or verifies the digital signature of the commitment certificate manager on the commitment certificate as well as the unique context data and selected commitment limit data and any condition data, time stamp information or other useful data to confirm that the commitment certificate was generated by a trusted authority and contains the appropriate requested information. As shown in block 124, the client communication unit 14 also checks the appropriate certificate revocation list associated with commitment certificates as obtained from a common repository, to determine whether or not the key certificate of the trusted authority, or in some instantiations, the commitment certificate has been revoked. As shown in block 126, the client communication unit 14 then sends the verified commitment certificate to all communication units needing the information. This may be especially needed in the case where the commitment certificate contains more than one commitment, but separate, and not necessarily similar or identical commitments for each P, respectively.

Once received, each unit performs signature verification on the commitment certificate to determine whether the commitment certificate was signed by the trusted commitment certificate manager using conventional signature verification techniques as known in the art, e.g., consulting certificate revocation lists. If the commitment certificate has been signed by a trusted commitment certificate manager, the receiving communication units then compare the unique context data stored in the certificate to see if it matches with commitment data that it might already have stored that correspond to what they expected for the given transaction, and that not the same commitment certificate was already received with the same ucd earlier. In this case it would not be accepted as a new commitment certificate. This is shown in block 128. The check may be done for example by comparing the "tr" data to stored "tr" data that was generated when the transaction began. As shown in block 130, if the transaction data "tr" matches, as well as all other relevant parameters in the unique context data 'ucd' if any, the relying communication partner relies on the client commitment certificate. The check of the clients certificate at a CR1 can be omitted in some instantiations if the certificate contains information confirming that the commitment certificate manager confirmed that the client's key has not been revoked. The process for one commitment certificate then ends. Only after this another process can start for this client. Hence the process begins again if another transaction starts which is associated with any other commitment, if a completely different transaction is requested, or if a commitment certificate in the same overall transaction but within a different context is requested.

As such, the method for providing commitment security among users includes providing a programmed communication unit to generate and authenticate commitment certificate request data based on user selected commitment data on a per transaction basis. The commitment certificate request data is generated to include unique context data associated with a first communication unit and a second communication unit. The method also includes providing a trusted commitment certificate authority that is trusted by the first and second communication units and generates commitment certificates in response to the commitment certificate request data.

Figure 4:
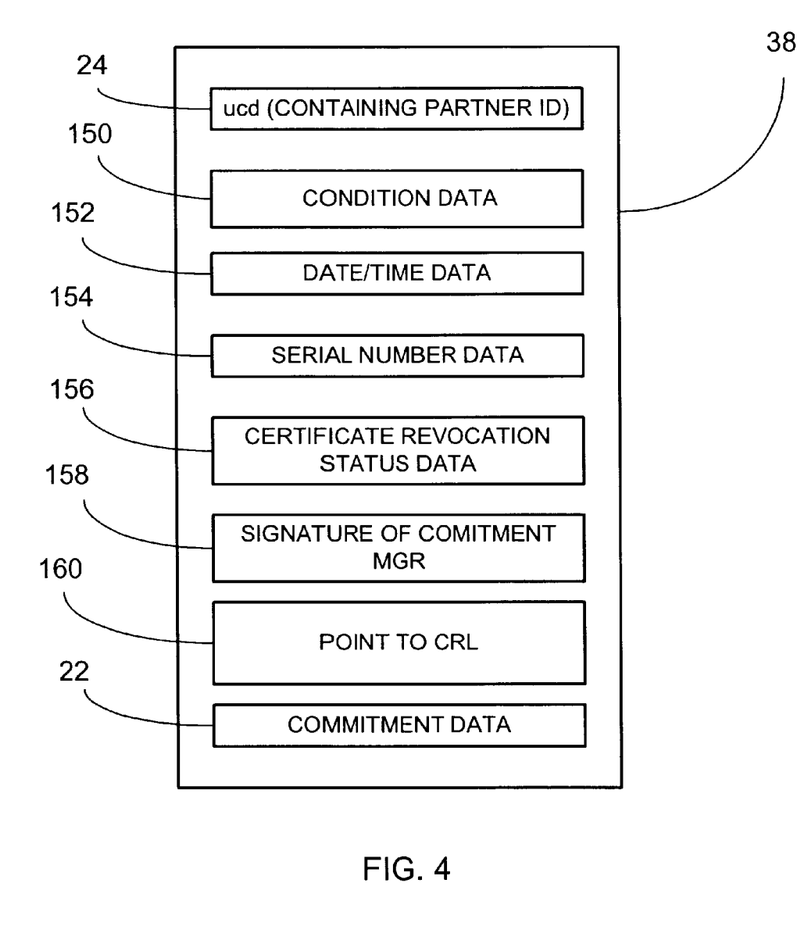
FIG. 4 is a graphic illustration of one embodiment of a commitment certificate in accordance with one embodiment of the invention.

Referring to FIG. 4, one example of a commitment certificate 38 is shown. This certificate might be any suitable data structure including, but not limited to, a certificate structure as described for example in Amendment 1 to ITU-T Recommendation X.509 (1993)|ISO/IEC 9594–8:1995, *Information Technology—Open Systems Interconnection—The Directory: Authentication Framework*, the X.509v3 certificate. By way of example, the commitment certificate 38 shown includes unique context data 24, condition data 150 containing at least condition data 21, date and time data 152, such as the date and time that the commitment certificate is issued, serial number data 154 which is a unique serial number assigned to each commitment certificate that is generated, certificate revocation status data 156 which confirms, for example, that the user's key has not been revoked, the digital signature 158 is the signature of the commitment certificate manager on the certificate completed commitment certificate of the commitment certificate manager, the public key certificate of the commitment certificate manager (not shown) and optionally a pointer to a position in a certificate revocation list 160. In addition commitment data 22 is also included. The complete data as shown in FIG. 4 are completely signed by the commitment certificate manager's aided by its signing key.

The commitment certificate verifier, commitment certificate generator, commitment certificate request provider, and unique context data generator may be software programs that are stored on one or more storage mediums. As such, the storage medium(s) includes memory that contains executable programs that when read by a processing device, cause the processing device to act as one or more of these and other components.

The above system and method issues user selected commitments on request by the user after at least a plausibility check of the user's digital signature, the issuing allowance being based on for example, an a priori user specified total or monthly total, for example, set of allowable digital commitments, or limit of, e.g., allowable dollar amounts, managed by the commitment certificate system wherein the commitment is bound to a user specified unique context.

It should be understood that the implementation of other variations and modifications of the invention in its various aspects will be apparent to those of ordinary skill in the art, and that the invention is not limited by the specific embodiments described. For example, a certificate expiring date determined by C might be included, which can even be splitted in different expiring dates for the different commitments for the different P's specified in the commitment certificate. The commitment conditions can even be multiple and/or embedded conditions, referring to any fact or happening, referring to any construction of (multiple) signed information which could even be certificates or embedded certificates, e.g., public key certificates, attribute certificates, or commitment certificates. If the context, commitment conditions, issuing conditions, part of commitment are clear within the commitment certificate manager providing the service and its users, such information can be omitted. Commitment certificates might be requested and issued along a 'tree' of P's, e.g., each P gets part of the information from the parent node and forwards it to its children nodes, and vice versa. Accordingly, both the commitments and recharging messages (resulting in 56) might be forwarded and checked along the tree, and even encrypted in an embedded way such that each node only sees the information provided directly by parent or child node (of the tree). The issuing condition fulfilling input could come as well from the outside. The issuing condition data and the commitment condition data can contain pairs or more complex combinations and embodiments of public keys and information while the condition is fulfilled if one of several possible specified parts of this information is signed by the private signing keys belonging to specific public keys. There may be several possibilities. For example, the issuing condition is fulfilled if the issuing condition fulfilling input contains one of "I will send you tomorrow an commitment certificate to pay you $1000", signed by the signing key which belongs to public key $pk_x$, or "I will work 5 hours in the garden of Z", signed by a gardener whose public key is $pk_g$. All issuing conditions as well as all commitment conditions might themselves contain any construction requiring any commitment certificates or other themselves, even if commitment certificates and other certificates are issued by other service providers than Authority 12. Commitment certificates issued need not be related to any other transaction at all but might just be sent as vouchers or promises. The commitment condition might be 'true' (or empty) a priori which means that it might arrive as an unconditional commitment at P, at least if the issuing conditions had been fulfilled. Even anonymous service can be provided if the CA only registers a pseudonym together with the key, if the real identity had provided (maybe aided by the same service) a commitment with the unconditional commitment that oneself agrees that the CA will uncover the real identity if dispute cases arise and the dispute cannot be solved only using the pseudonym. Multiple commitments with different conditions might be issued in one commitment certificate to the same party P. The commitment limit data need not only be a limit of money. It could also be a set of data representing commitments specified a priori by client C, including (or not including) the beneficiary and/or any conditions other than the commitment conditions provided, for instance commitments for "2 hours of baby sitting", etc. One of the possible definition of the set commitments (even if including input fulfilling commitment conditions) is that it must build a monoid over some pre-defined set. Or, for example, P is not fixed but can also be specified by any condition like "the first P who answers to my offer", the commitment might be a free journey along the Zurich lake, and the commitment condition is that P accepts the offer, while C might be a merchant who requests, gets and distributes the commitment certificate. The client communication unit itself might consist of a group of several C's whose commitments and limits are managed commonly for the whole group, and where each of the C's can request certificates, and where different passwords or other issuing conditions might be specified for the different group members C. Codes can be defined for the most reasonable commitments and conditions, to enable efficient solutions. The commitment certificates need not necessarily be called 'certificates' but also just can be signed statements, which contain the necessary information. The user-initiated input in the CC request data 28 can also be transferred to the commitment certificate manager 12 via P.

It is therefore contemplated to cover by the present invention, any and all modifications, variations, or equivalents that fall within the spirit and scope of the basic underlying principles disclosed and claimed herein.

What is claimed is:

1. A networked communication system comprising:
   at least a first communication unit including a commitment certificate request data provider that generates commitment certificate request data based on unique context data (ucd) associated with the first communication unit and at least a second communication unit and based on user selected commitment data on a per transaction basis;
   at least a third communication unit, trusted by the first and second communication unit, that generates a trusted commitment certificate in response to the commitment data and the unique context data; and
   at least the second communication unit, being operatively coupled to receive the trusted commitment certificate, and including a trusted commitment certificate verifier.

2. The networked communication system of claim 1 wherein the third communication unit generates the trusted commitment certificate based on at least a-priori user-selectable total commitment limit data.

3. The networked communication system of claim 1 including a commitment certificate update request signal generator to facilitate certificate recharging.

4. The networked communication system of claim 1 wherein the first communication unit includes a unique context data provider wherein the unique context data includes data representing at least data unique to a given transaction context between the first communication unit and the second communication unit.

5. The networked communication system of claim 1 including a commitment allowance data store, operatively coupled to the third communication unit, that contains at least per user commitment allowance data.

6. The networked communication system of claim 5 wherein the third communication unit serves as a commitment certificate generator and generates the commitment certificate based on at least a portion of stored per user commitment allowance data.

7. The networked communication system of claim 5 wherein the per user commitment allowance data includes data representing per transaction liability limits or per transaction commitment limits on a per user basis.

8. The networked communication system of claim 6 wherein the commitment certificate generator updates per user commitment allowance data in response to commitment certificate request data.

9. The networked communication system of claim 8 wherein the first communication unit generates the commitment certificate request data that includes at least the unique context data wherein the unique context data includes data representing a first user associated with the first communication unit, a second user associated with the second communication unit, identification data corresponding to the third communication unit and transaction identification data.

10. The networked communication system of claim 1 wherein the first communication unit provides per transaction user selected commitment data.

11. The networked communication system of claim 1 wherein the commitment certificate generator generates a public key based commitment certificate that contains at least data representing unique context data, condition data, commitment data and a signature from the third communication unit.

12. The networked communication system of claim 1 wherein the unique context data includes data representing at least the third communication unit, the first communication unit or public key associated with the first communication unit, the second communication unit, and a unique transaction identifier seq chosen through the first communication unit.

13. The networked communication system of claim 1 including an anonymity unique context data provider that generates context data as a function of unique context data.

14. The networked communication system of claim 1 including a commitment certificate request verifier, responsive to commitment certificate request data from the first communication unit, that determines whether a commitment certificate has already been issued for given unique context data.

15. A networked communication system comprising:
 a first communication unit including a commitment certificate request data provider that generates commitment certificate request data based on unique context data (ucd) associated with the first communication unit and a second communication unit and based on user selected commitment data, user selected commitment issuing condition data, and user selected data fulfilling issuing condition data, on a per transaction basis, and including a unique context data provider wherein the unique context data includes data representing at least transaction identification data unique to a given transaction between the first communication unit and the second communication unit;
 a third communication unit, trusted by the first and second communication unit, that generates a trusted commitment certificate in response to the commitment data and the unique context data;
 the second communication unit, being operatively coupled to receive the trusted commitment certificate, and including a trusted commitment certificate verifier; and
 a commitment allowance data store, operatively coupled to the third communication unit, that contains at least per user commitment allowance data;
 wherein the first communication unit generates the commitment certificate request data that includes at least the unique context data wherein the unique context data includes data representing a public key associated with the first communication unit, a second public key associated with the second communication unit, identification data corresponding to the third communication unit and transaction identification data.

16. The networked communication system of claim 15 wherein the trusted commitment certificate includes a public key based commitment certificate that contains at least data representing unique context data, condition data, commitment data and a signature corresponding to the third communication unit.

17. The networked communication system of claim 16 including a commitment certificate request verifier, responsive to commitment certificate request data from the first communication unit, that determines whether a commitment certificate has already been issued for a given unique context data.

18. A method for providing commitment security among users in a computer network comprising the steps of:
 providing a first communication unit that is programmed to generate commitment certificate request data that is based on user selected commitment data on a per transaction basis and based on unique context data (ucd) associated with the first communication unit and a second communication unit and
 providing a third communication unit, trusted by the first and a second communication unit, that generates a trusted commitment certificate in response to the user selected commitment data and unique context data.

19. The method of claim 18 including generating the trusted commitment certificate based on a-priori user-selectable total commitment limit data.

20. The method of claim 18 including generating a commitment certificate update request signal to facilitate certificate recharging.

21. The method of claim 18 including providing the unique context data to include data representing at least transaction identification data unique to a given transaction between the first communication unit and the second communication unit.

22. The method of claim 18 including storing at least per user commitment allowance data to facilitate determination of whether to issue the trusted commitment certificate.

23. The method of claim 22 including the step of generating the commitment certificate based on at least a portion of stored per user commitment allowance data and on additional issuing condition data.

24. The method of claim 22 wherein the per user commitment allowance data includes data representing per transaction limited liability commitments on a per user basis.

25. The method of claim 23 including updating per user commitment allowance data in response to commitment certificate request data.

26. The method of claim 25 wherein the first communication unit generates the commitment certificate request data that includes at least the unique context data wherein the unique context data includes data representing a first user associated with the first communication unit, a second user associated with the second communication unit, identification data corresponding to the third communication unit and transaction identification data.

27. The method of claim 18 wherein the first communication unit provides per transaction user selected commitment data.

28. The method of claim 18 including generating a public key based commitment certificate that contains at least data representing unique context data, condition data, commitment data and a signature corresponding to the third communication unit.

29. The method of claim 18 including generating anonymity context data as a function of unique context data.

30. The method of claim 18 including determining whether a commitment certificate has already been issued for a given context.

31. The method of claim 18 including generating the commitment certificate request data to based on context specific issuing condition data for use in issuing the trusted commitment certificate.

32. A storage medium comprising
 memory containing executable instructions such that when processed by at least one processing unit causes the at least one processing unit to generate and authenticate commitment certificate request data that is based on user selected commitment data on a per transaction basis and based on unique context data (ucd) associated with the first communication unit and a second communication unit and that generates a trusted commitment certificate in response to the user selected commitment data and unique context data.

33. The storage medium of claim 32 including memory containing programming instructions that when processed by a processing unit causes the processing unit to generate the trusted commitment certificate based on a-priori user-selectable total commitment limit data.

34. The storage medium of claim 32 including memory containing programming instructions that when processed by a processing unit causes the processing unit to generate a commitment certificate update request signal to facilitate certificate recharging.

35. The storage medium of claim 33 including memory containing programming instructions that when processed by a processing unit causes the processing unit to provide the unique context data to include data representing at least transaction identification data unique to a given transaction between the first communication unit and the second communication unit.

36. The storage medium of claim 32 including memory containing programming instructions that when processed by a processing unit causes the processing unit to store at least per user commitment allowance data to facilitate determination of whether to issue the trusted commitment certificate.

* * * * *